(No Model.)
W. W. KENFIELD.
BICYCLE.
No. 448,750.  Patented Mar. 24, 1891.
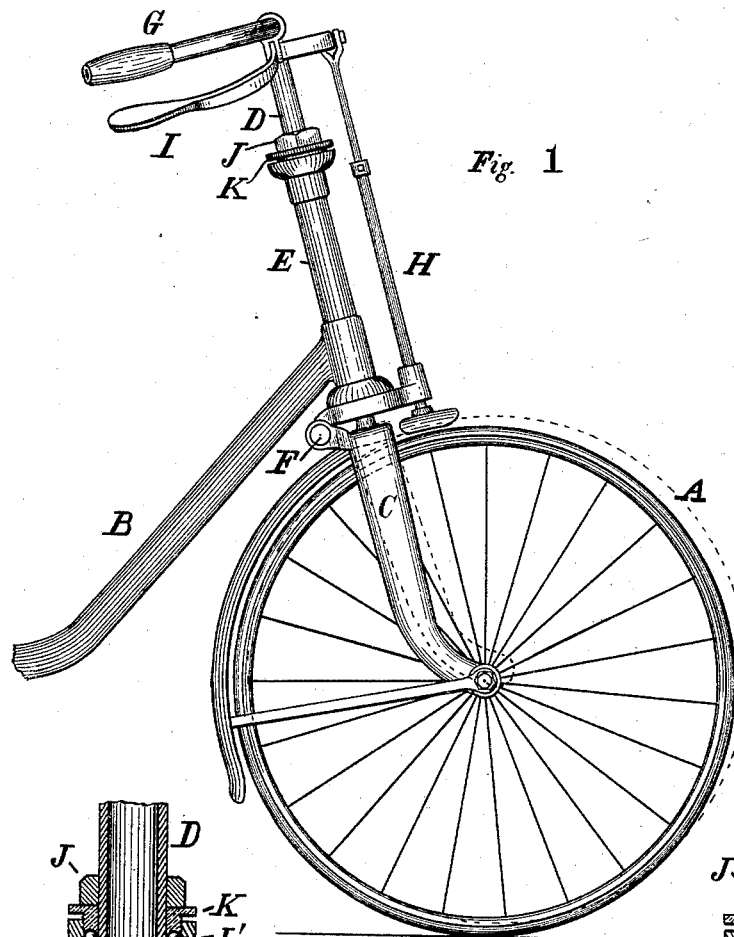
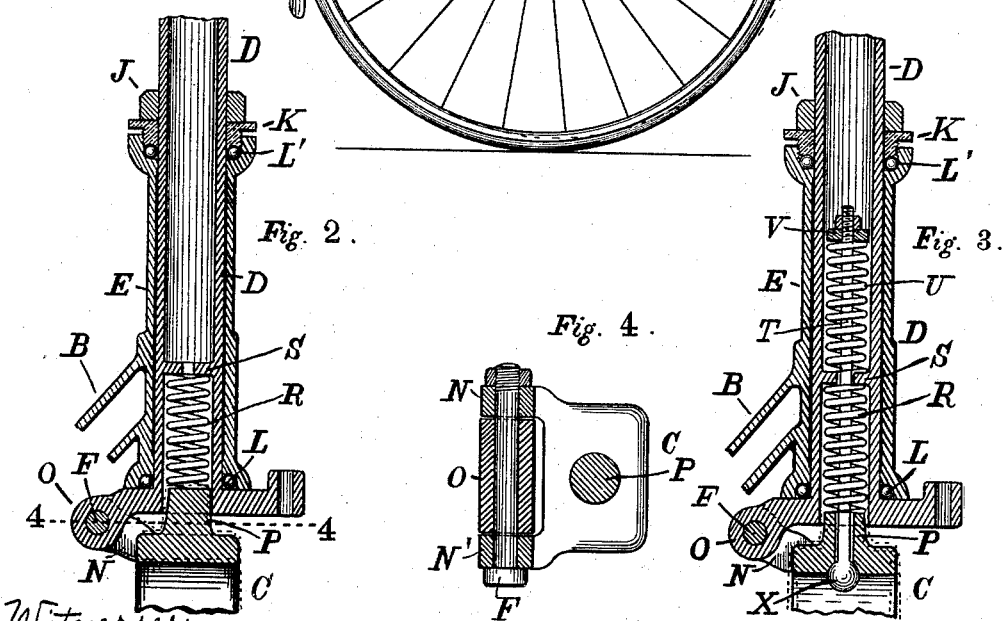
Witnesses:
J. Watson Sims
C. G. Crannell
Inventor:
Wm. W. Kenfield,
By Geo. B. Selden,
Atty.

UNITED STATES PATENT OFFICE.

WILLIAM W. KENFIELD, OF ROCHESTER, NEW YORK, ASSIGNOR TO THE ROCHESTER CYCLE MANUFACTURING COMPANY, OF SAME PLACE.

BICYCLE.

SPECIFICATION forming part of Letters Patent No. 448,750, dated March 24, 1891.

Application filed October 17, 1890. Serial No. 368,417. (No model.)

*To all whom it may concern:*

Be it known that I, WILLIAM W. KENFIELD, a citizen of the United States, residing at Rochester, in the State of New York, have invented certain Improvements in Bicycles, of which the following is a specification, reference being had to the accompanying drawings.

My invention relates to certain improvements in the construction of spring-forks for Safety bicycles, which improvements are fully described and illustrated in the following specification and the accompanying drawings, the novel features thereof being specified in the claims annexed to the said specification.

My improvements in spring-forks for bicycles are represented in the accompanying drawings, in which—

Figure 1 is a side elevation of the front wheel, handle, and a portion of the frame of a Safety or rear-driving bicycle embodying my invention. Fig. 2 is a central vertical section through the handle-bar tube and the upper part or crown of the fork. Fig. 3 is a similar section representing a modification. Fig. 4 is a transverse section through the joint between the handle-bar tube and the fork on the line 4 4, Fig. 2.

In the accompanying drawings, A represents the front or steering wheel of a Safety or rear-driving bicycle; B, the backbone or frame; C, the fork, and D the handle-bar tube. The wheel is of any ordinary or preferred construction, and it is attached to the fork C by any usual form of bearing. At its upper end or crown the fork is provided on the rear side with the two projecting lugs or eyes N N', Fig. 4, between which the eye O on the rear side of the handle-bar tube fits, being secured in place by the bolt F passing through the eyes. In this way a firm and substantial joint is formed between the fork and the handle-stem or steering-rod, so that the fork is permitted to move a certain distance relatively to the frame of the machine, as indicated by the full and dotted lines in Figs. 1 and 2, whereby the shock or jar to the rider caused by obstacles or rough roads is avoided. On account of the length of the fork a very small amount of motion on the joint is multiplied, and a much greater movement of the wheel A relatively to the frame and seat is allowed. On the upper end of the crown of the fork a boss or lug P is formed, being forged integral with the fork brazed on or otherwise attached thereto, which boss projects upward a short distance into the lower end of the handle-bar tube D. As represented in Fig. 2, this lug does not bear against the inner surface of the tube on the rear side, so that the yielding motion of the fork and wheel is permitted, as before described. Inside the lower end of the handle-bar tube is placed a suitable spiral spring R, Fig. 2, which bears against the lug P and on a ring or plug S, inserted and fastened in the tube. This spring is compressed whenever the fork moves relatively to the frame, and imparts elasticity to the structure, making the bicycle ride easy. The lug P, striking against the front side of the opening in the handle-bar tube, forms a positive stop, whereby the wheel is prevented from turning backward under the frame. The handle-bar tube is connected to the head E of the frame, so that it may turn freely therein by any usual or preferred type of ball-bearings—such, for instance, as the rings or balls L L', the adjusting-nut K, and jam-nut J.

In the modification shown in Fig. 3 a spring is employed both above and below the plug or ring in the handle-bar tube. A rod T is employed in this case to connect the upper spring U with the crown of the fork, and the boss P is made smaller, so as to permit the fork to swing relatively to the tube in both directions, forward and backward. The rod T passes through a crown in a suitable opening, being provided below the crown with a suitable head X, Fig. 3. At its upper end the rod is provided with the nuts V. In other respects the construction is the same as that already described. H is a brake of any usual form, and I the brake-lever. G represents the handle.

It is obvious that the joint between the crown of the fork and the tube may be formed in other ways than that herein shown, and that the spring may be different or differently arranged, and that the stop for limiting the movement of the fork may be constructed in a different manner without departure from the principles of my improvement. It is also obvious that a rod may be used instead of the tube above the spring or springs.

My improvement is cheap to manufacture, does not disfigure the machine, is very easy to the rider, and rigid in its steering. It also possesses the advantage that should the spring break the rider can still get home on a rigid fork. It is obvious, also, that a single spring, attached at one end to the interior of the tube and at the other end to the crown, might be used to perform the functions of the two springs shown in Fig. 3.

I claim—

1. The combination, in a bicycle, of the handle-bar tube D, provided with internal projection or collar S, the fork C, connected to the lower end of the handle-bar tube by a pivoted joint located in rear of the tube and provided with a lug or projection entering the lower end of the tube and forming a stop to limit the movement of the fork, and a compression-spring concealed within the tube and bearing at its upper end against the internal projection S and at its lower end against the fork, substantially as described.

2. The combination, in a bicycle, of the handle-bar tube D, provided with internal projection or collar S and rearwardly-projecting perforated eye O, the fork C, having lug P engaging in the lower end of the tube, the ears N N', the pivot F, and compressible spring R, concealed within the tube, substantially as described.

3. The combination, in a bicycle, of the handle-bar tube D, provided with internal projection or collar S, the fork C, connected to the lower end of the handle-bar tube by a pivoted joint located in rear of the tube and provided with a lug or projection entering the lower end of the tube and forming a stop to limit the movement of the fork, the springs R and U, located within the tube above and below the collar S, and the rod T, passing through the springs and connected with the fork, substantially as described.

4. The combination, in a bicycle, of the handle-bar tube D, the fork C, jointed to the lower end of the tube by a pivoted joint located on the rear side of the tube and having a lug P, which projects into the lower end of the tube and is smaller than the opening therein, and a spring arranged to press the fork away from the tube, substantially as described.

WILLIAM W. KENFIELD.

Witnesses:
GEO. B. SELDEN,
C. G. CRANNELL.